O. J. GROEHN.
MACHINE FOR FORMING SEAMED TUBES.
APPLICATION FILED APR. 6, 1914.

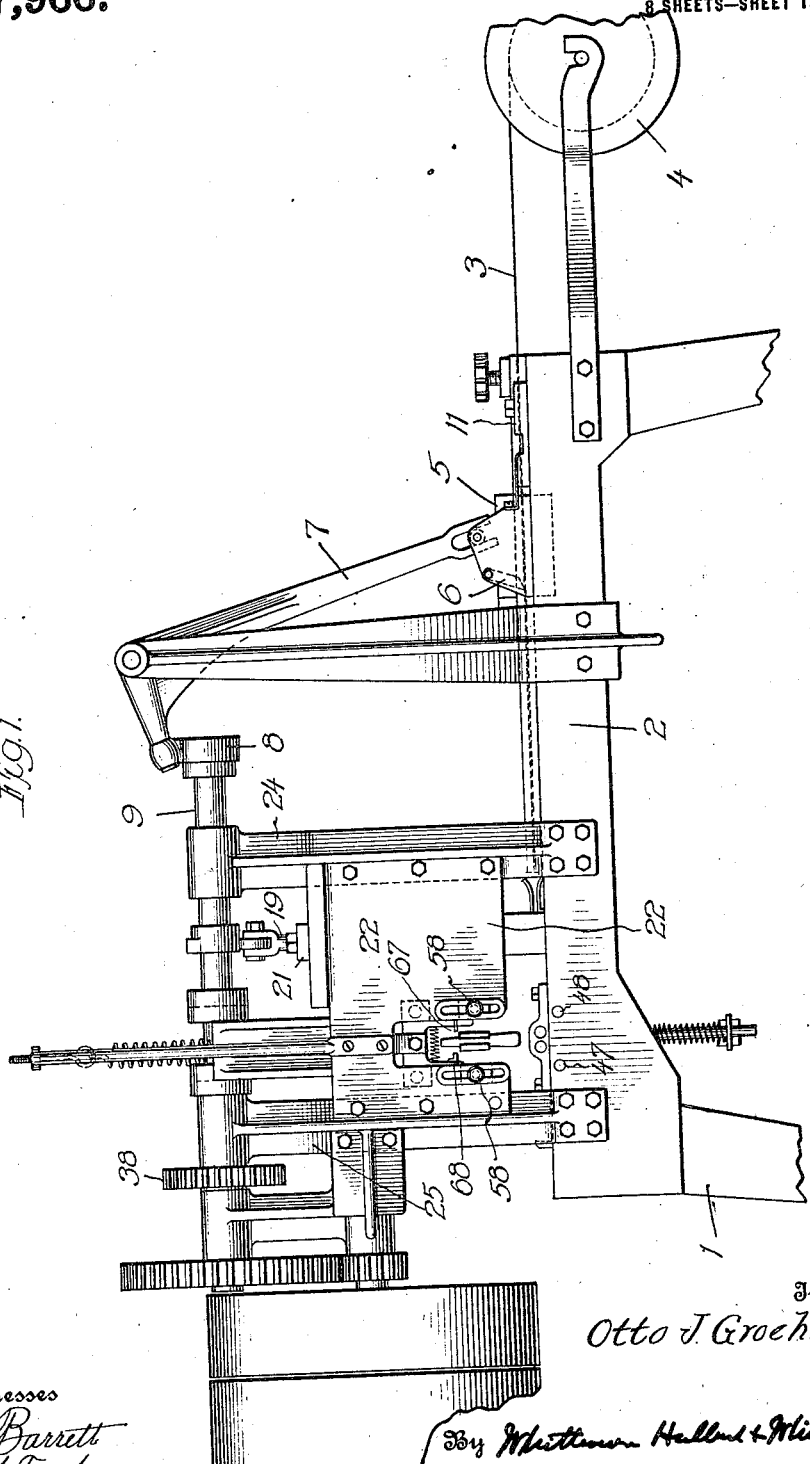

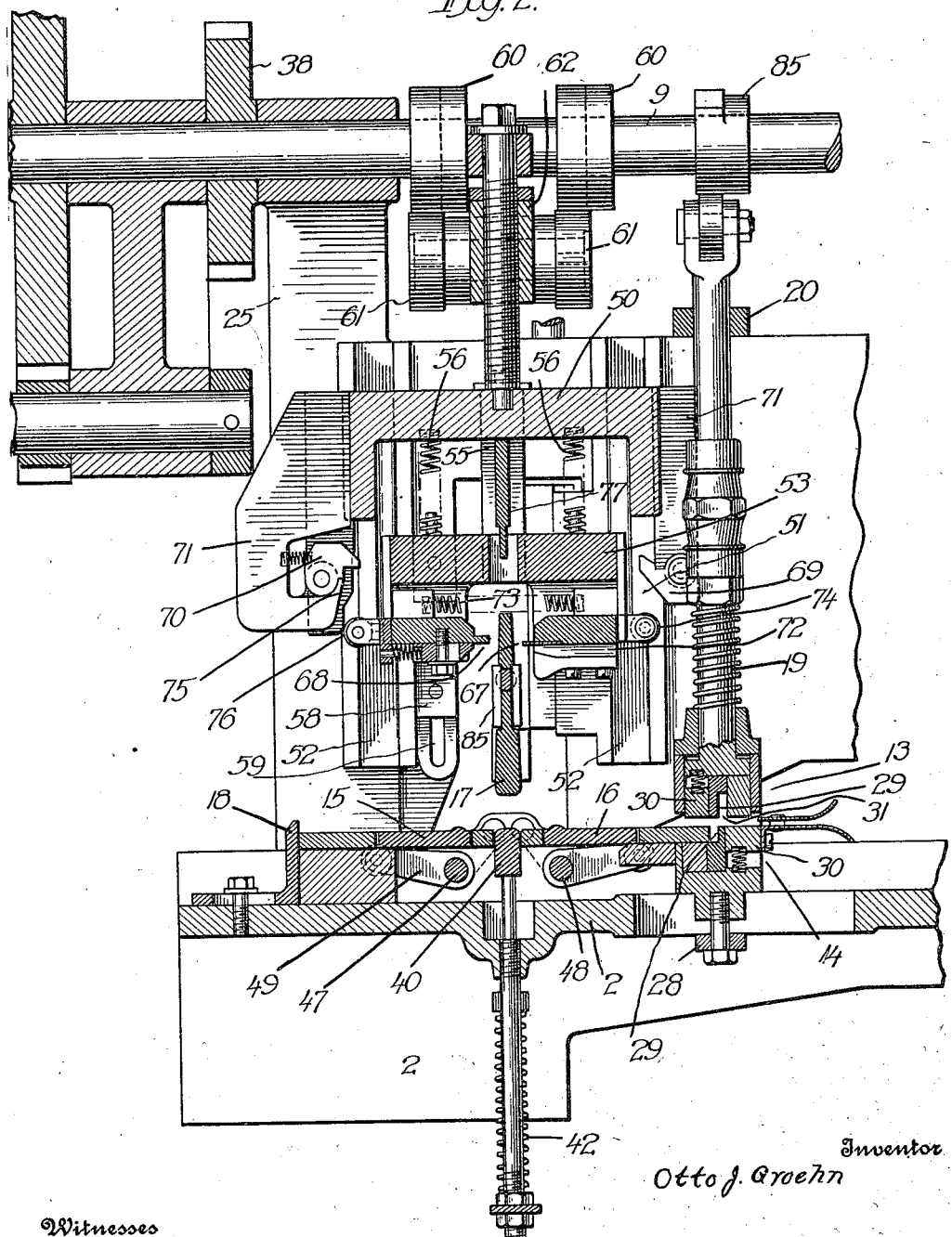

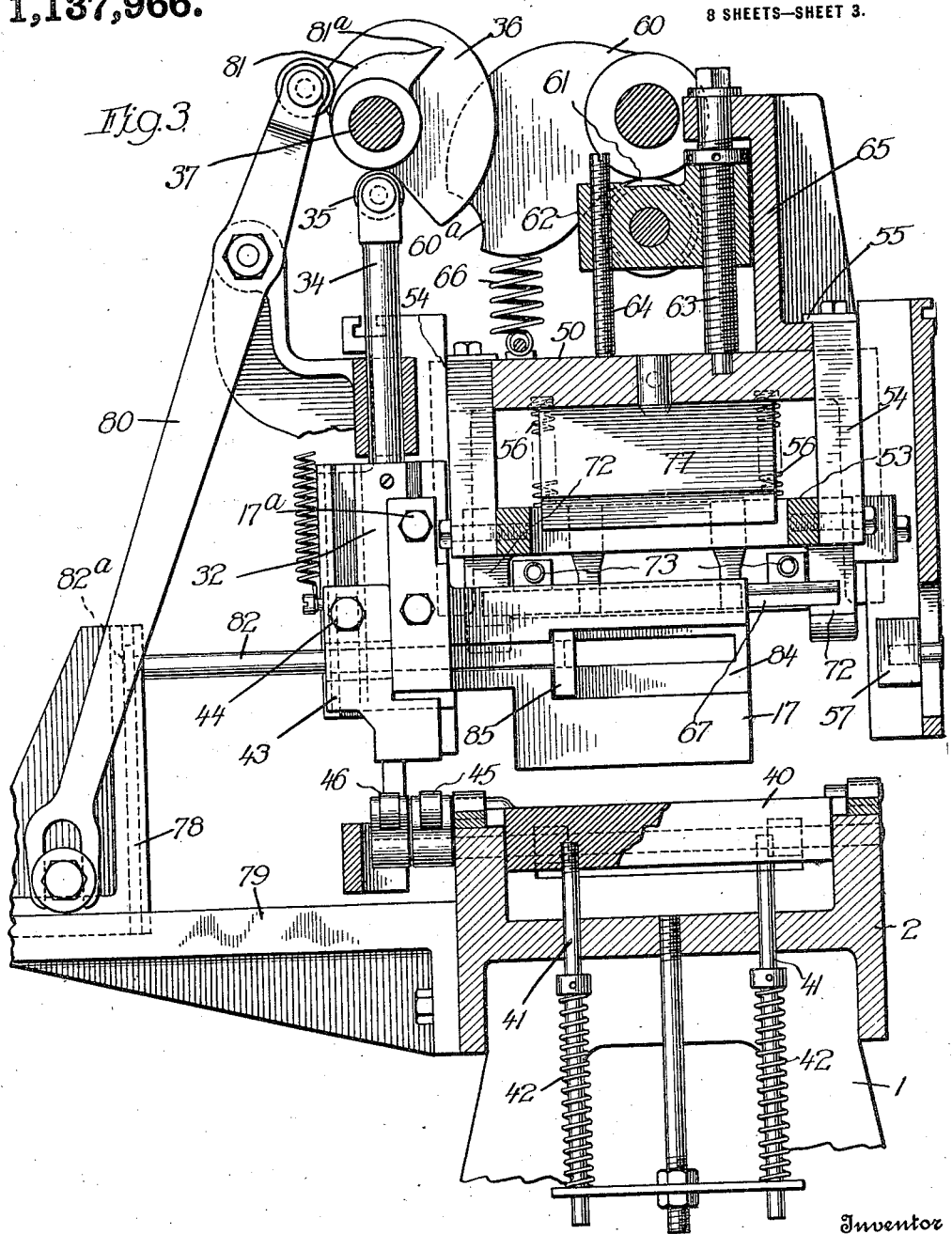

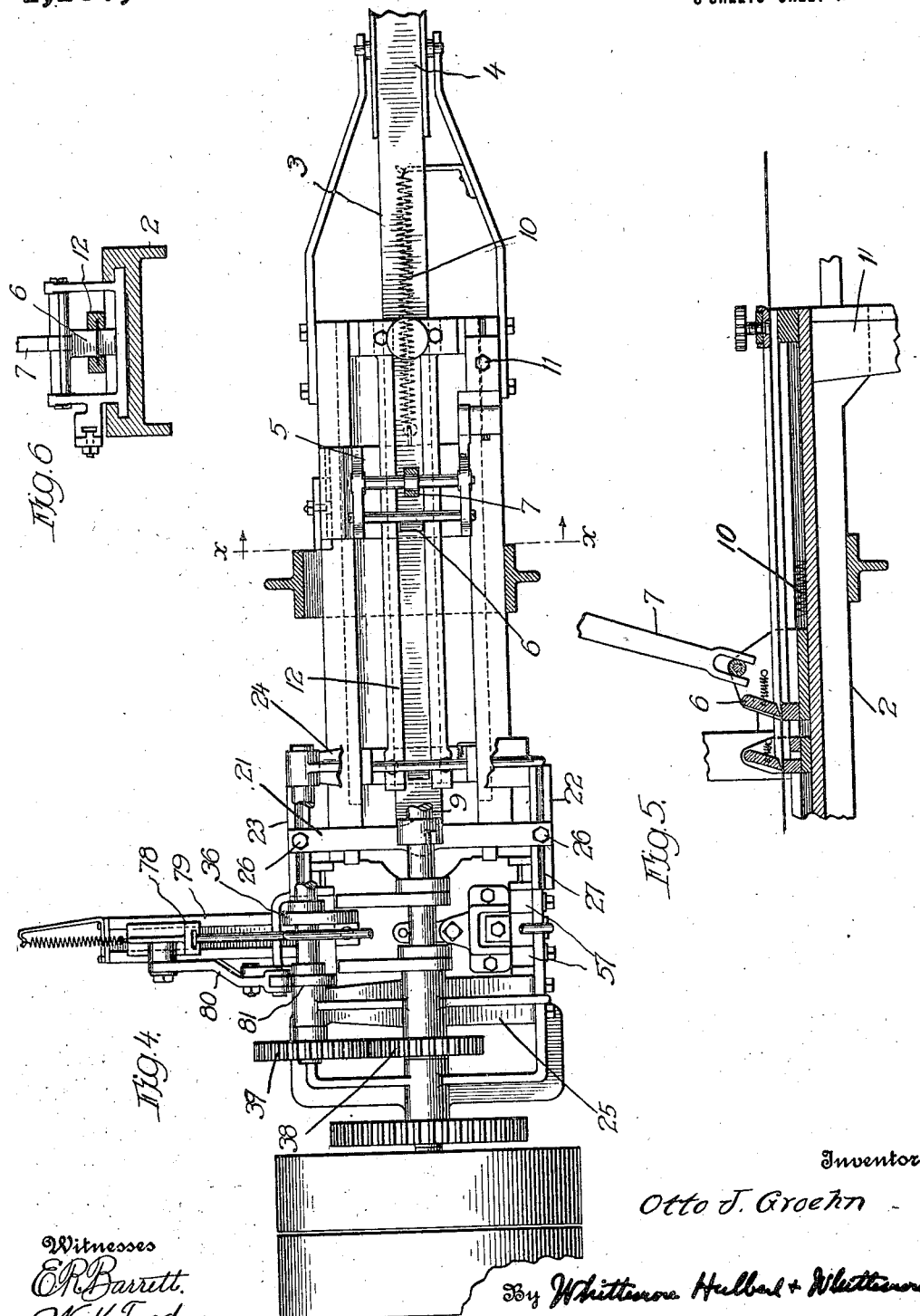

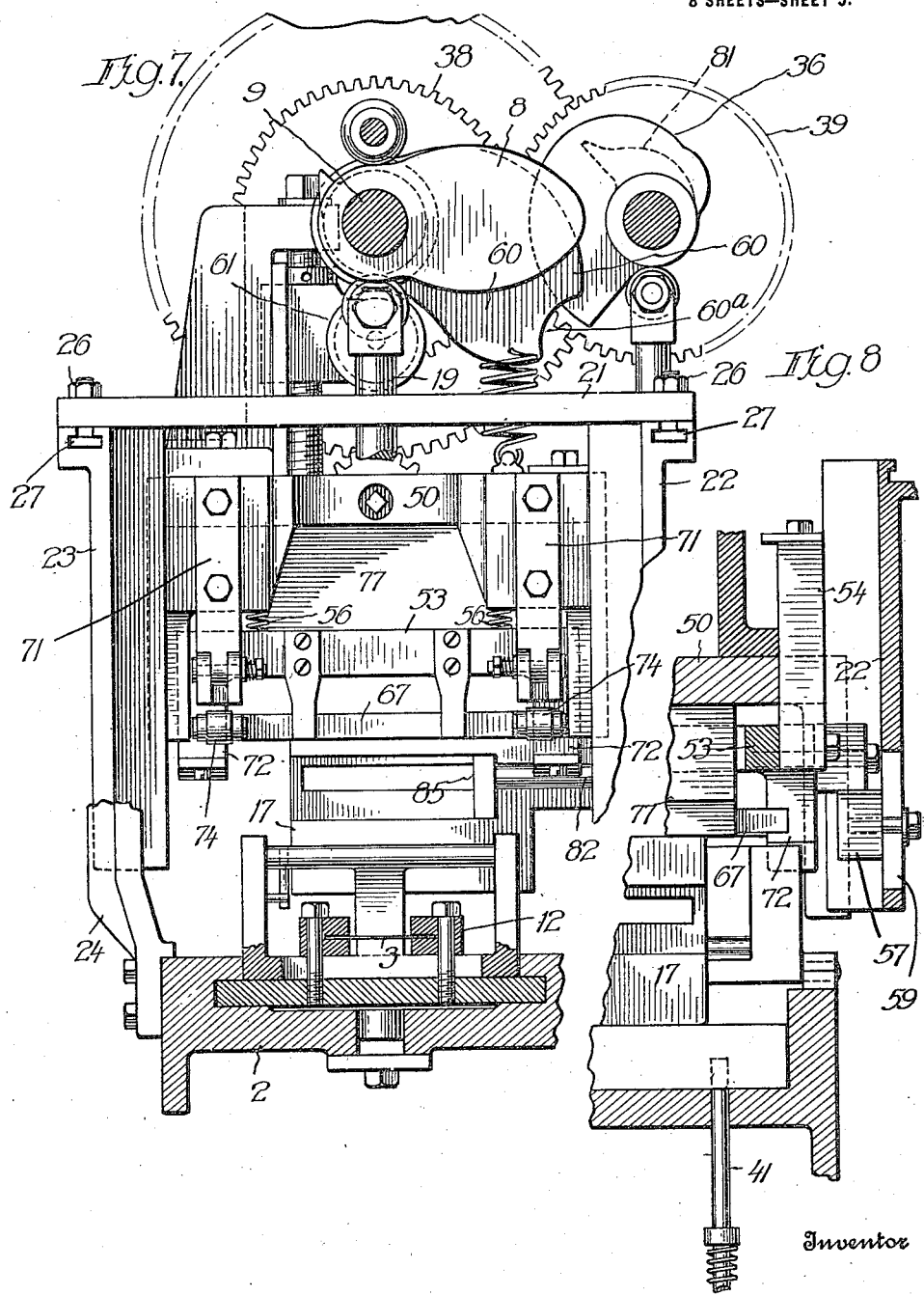

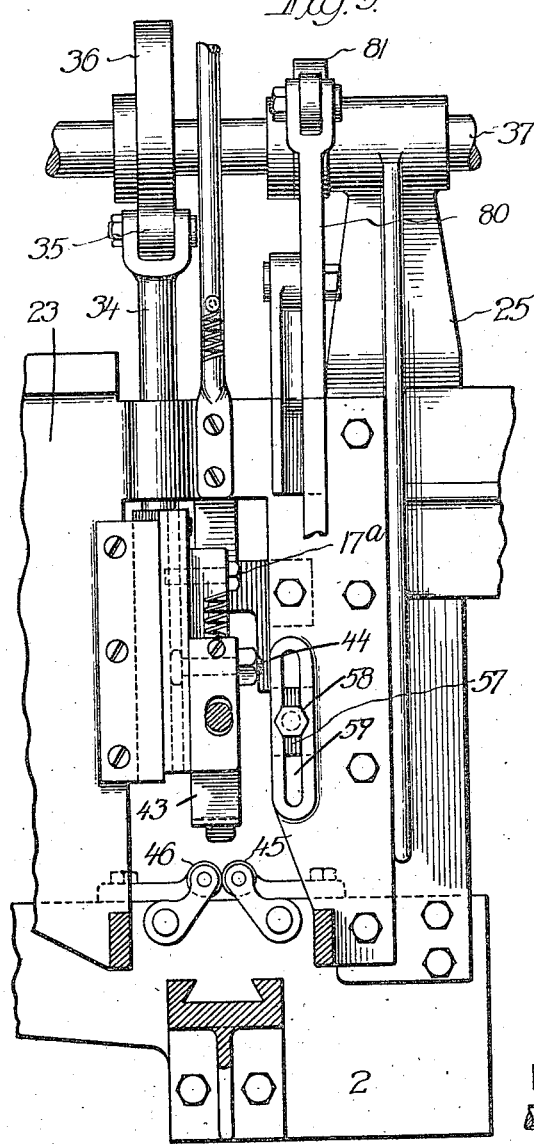
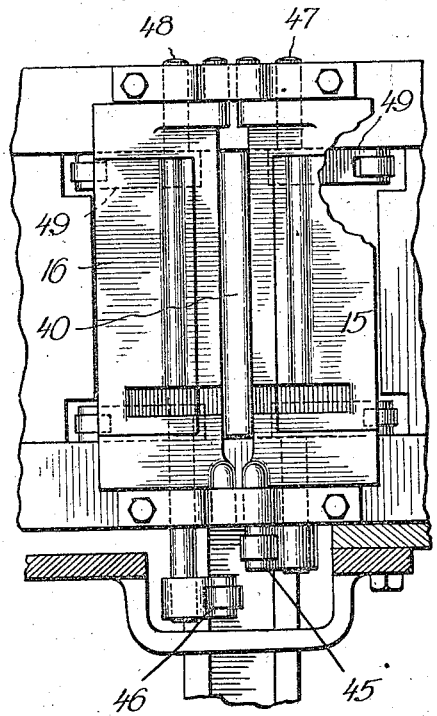
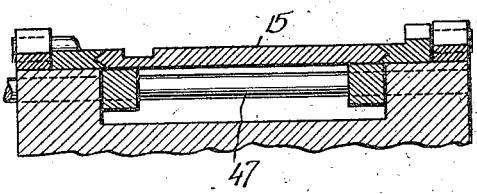

1,137,966.

Patented May 4, 1915.
8 SHEETS—SHEET 7.

Witnesses,
E. R. Barutt
W. K. Ford

Inventor
Otto J. Groehn
By Whittemore Hulbert Whittemore
Attorney's

O. J. GROEHN.
MACHINE FOR FORMING SEAMED TUBES.
APPLICATION FILED APR. 6, 1914.

1,137,966.

Patented May 4, 1915.
8 SHEETS—SHEET 8.

Witnesses
E. R. Barrett

Inventor
Otto J. Groehn
By Whittemore, Hulbert & Whittemore
Attorneys

UNITED STATES PATENT OFFICE.

OTTO J. GROEHN, OF DETROIT, MICHIGAN, ASSIGNOR TO BRISCOE MANUFACTURING COMPANY, OF DETROIT, MICHIGAN, A CORPORATION OF MICHIGAN.

MACHINE FOR FORMING SEAMED TUBES.

1,137,966.

Specification of Letters Patent. Patented May 4, 1915.

Application filed April 6, 1914. Serial No. 830,047.

*To all whom it may concern:*

Be it known that I, OTTO J. GROEHN, a citizen of the United States of America, residing at Detroit, in the county of Wayne and State of Michigan, have invented certain new and useful Improvements in Machines for Forming Seamed Tubes, of which the following is a specification, reference being had therein to the accompanying drawings.

The invention relates to machines for forming tubes such as are used in the formation of radiators, and it is the particular object of the invention to obtain a construction which is adapted to form tubes of various sizes and which may be easily adjusted where change is made from one size to another.

It is a further object to obtain a machine in which the operation is automatic from the feeding of the sheet metal strip into the machine to the delivery of the finished tube.

Figure 12:
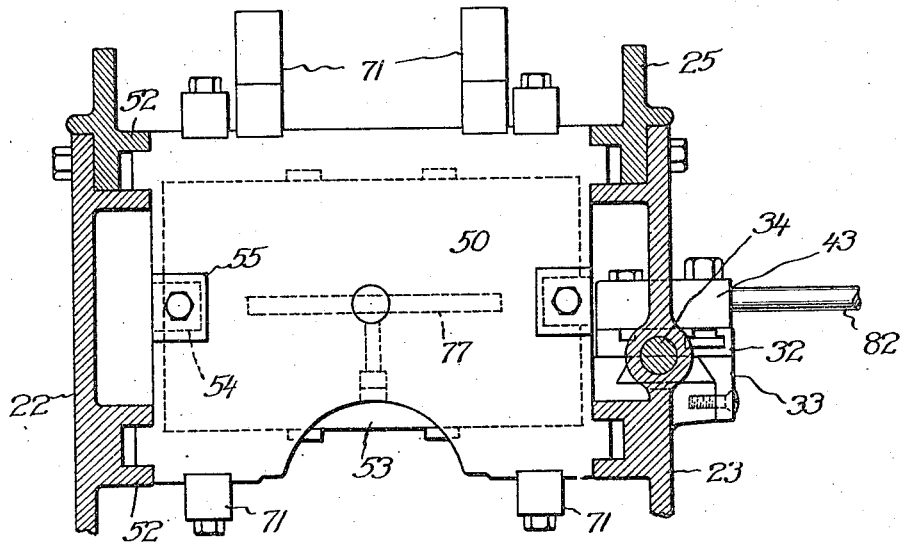
Figure 13:
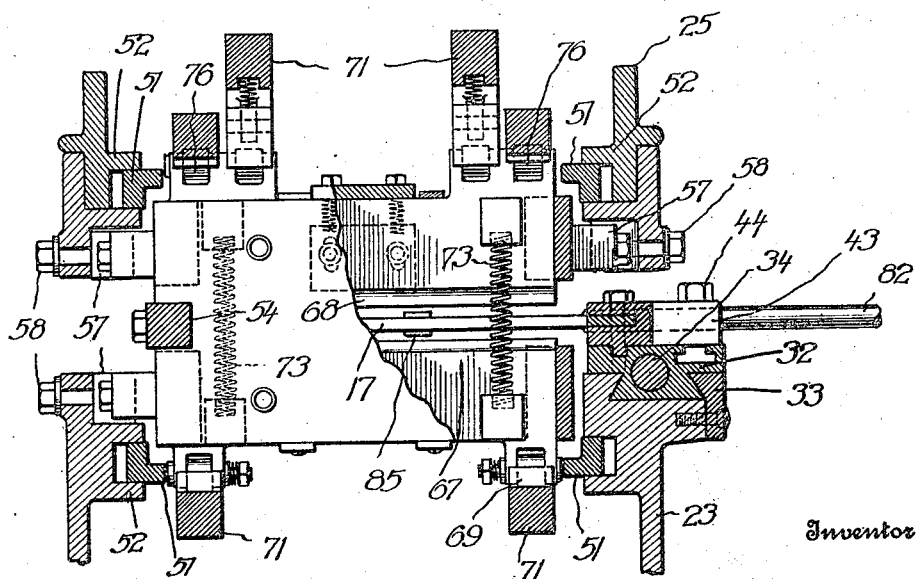
Figure 19:
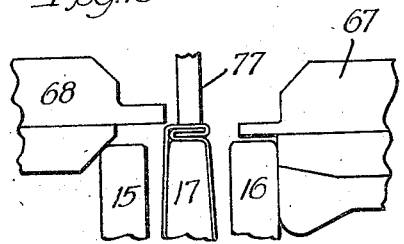
Figure 20:
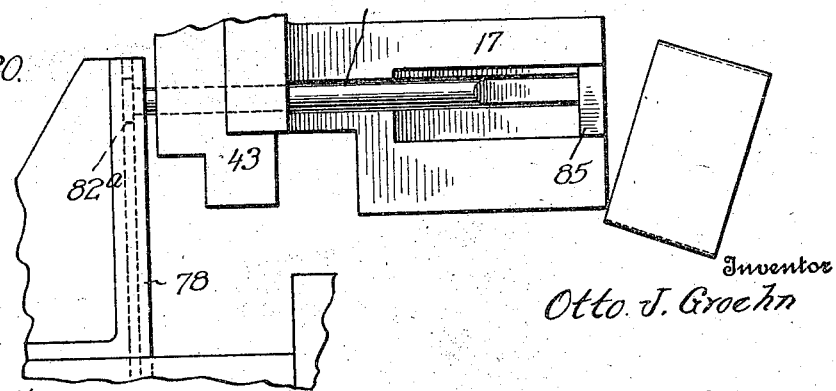

In the drawings: Figure 1 is a side elevation of the machine; Fig. 2 is a longitudinal section therethrough; Fig. 3 is a cross section partly in elevation; Fig. 4 is a plan view; Fig. 5 is a longitudinal section through the feed mechanism shown in Fig. 4; Fig. 6 is a cross section thereof on line x—x Fig. 4; Fig. 7 is a sectional elevation looking in the opposite direction from Fig. 3; Fig. 8 is a fragmentary transverse sectional view; Fig. 9 is a rear elevation of a portion of the machine; Fig. 10 is a plan view of the folding mechanism; Fig. 11 is a cross section through the blank-supporting bed; Fig. 12 is a sectional plan view showing the upper plunger head; Fig. 13 is a similar view showing the lower plunger head; Figs. 14, 15, 16, 17, 18 and 19 are elevations showing the mechanism for performing the successive steps in the seaming operation; and Fig. 20 is an elevation of the mandrel and stripper for disengaging the work therefrom.

In general organization my improved machine comprises, first, means for advancing a sheet metal strip and cutting off the same into suitable lengths for forming the tubes; second, means for folding the severed blanks around a suitable mandrel; third, means for seaming the opposite edges of the blank to form the tube; and fourth, means for disengaging the formed tube from the mandrel. Inasmuch as the tubes are made of various sizes, it is necessary to provide adjustments by which the length of the severed blank is altered. This also necessitates exchangeable mandrels and provision for adjusting the mechanism which performs the folding and seaming so that it will coöperate with the various mandrels, and these various adjustments are provided for by the following construction: 1 is a suitable frame provided with a bed plate 2 along which a sheet metal strip 3 is fed from a reel 4, by a reciprocatory feeder 5 carrying dogs 6. The feeder is operated by a lever 7 actuated in its forward direction by a cam 8 upon a shaft 9 and returned by a spring 10. The length of feed is determined by an adjustable stop 11 which limits the return movement of the feeder and consequently the distance it would be advanced by the operation of the cam.

Beyond the feeder the strip 3 is advanced along guides 12 to the severing and folding mechanism. This comprises coöperating shearing dies 13 and 14, which are adapted to simultaneously form reverse-bent hooks upon the ends of the strip on opposite sides of the cut; also folding mechanism including hinged wings 15 and 16 and a mandrel 17 upon opposite sides of which the wings fold. Adjustment for different sized blanks is provided for by mounting the coöperating dies 13 and 14 so that they may be moved longitudinally of the bed to vary the distance between the same and the mandrel, which latter remains in a fixed vertical plane. There is also a stop 18 against which the end of the blank is fed, which is adjustable to correspond to the adjustment of the severing dies.

The die 13 is secured to a vertically-reciprocatory plunger 19 which is mounted in a bearing 20 upon a cross bar 21 extending between front and rear vertical frames 22 and 23. These frames are secured to upright cross frames 24 and 25, which are secured to and extend upward from the bed, and the bar 23 is longitudinally, adjustably secured on the front and rear frames by clamping bolts 26, the heads of which engage T-shaped slots 27 in said frames 22 and 23. Thus, by adjusting the position of the bar 23, the plunger 19 and die 13 may be shifted in position to alter its distance from the mandrel 17. The die 14 may be similarly adjusted, being secured to the bed 2 by a clamp 28 capable of longitudinal adjustment.

Figure 14:
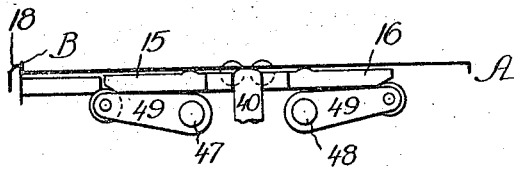

The reverse-bent hooks are formed upon the severed sections of the strip by coöperating rabbeted shearing blades 29 and yieldable filler-blocks 30, the arrangement being such that the edges of the blades 29 will first shear the strip and will then fold the portion opposite the rabbets or recesses 31. The hook or bent flange on the severed blank will thus be turned down, while the end of the unsevered strip will be turned up, so that in the subsequent feeding operation, this upturned flange will be advanced until it strikes against the stop 18. Thus each completely severed blank is provided with an upturned flange at its forward end and a downturned flange at its rear end, as shown in Fig. 14.

Figure 15:
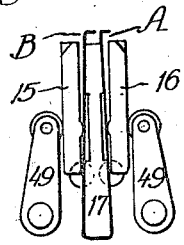

*Folding mechanism.*—The mandrel 17 is adjustably and exchangeably mounted upon a vertically-slidable head 32, which engages guideways 33 on the rear frame 23. This slide is actuated by a plunger 34 having at its upper end a roll 35 engaged by a cam 36 on a shaft 37 parallel to the shaft 9 and driven therefrom through intermeshing gears 38 and 39. The cam 36 is so fashioned and timed that after the blank is fed against the stop 18 and is severed from the strip, the slide 32 will be lowered carrying downward the mandrel 17 and pressing the lower edge thereof against the center of the blank. Beneath the mandrel is a yieldable block 40 which is secured to vertically-slidable shanks 41 and is pressed upward under the tension of springs 42, so as to place a clamping pressure upon the blank which will hold it from displacement during the folding operation. The folding is effected by the continued downward movement of the mandrel 17 and the simultaneous swinging movement of the wings 15 and 16, which latter are actuated by a downward extension 43 adjustably secured to the slide 32 by the clamping bolt 44. This extension bears against roller rockers 45 and 46 upon rock-shafts 47 and 48 carrying roller rock-arms 49, which bear against the sides of the wings 15 and 16 and swing the same upward upon their pivots. The arrangement is such that the blank will be folded upon opposite sides of the mandrel, with the hooked or flanged ends projecting slightly above the upper end of the mandrel, as shown in Fig. 15.

*Seaming mechanism.*—The seaming of the blank is effected by mechanism carried by a vertically-reciprocatory member and actuated during the movement thereof. This comprises a main reciprocatory head 50 provided with downwardly-extending guides 51 slidably secured in ways 52 upon the front and rear frame plates 22 and 23. This head carries a sub-head 53 which is slidably supported thereon by straps 54 having hooks 55, while spring 56 between the heads holds the same in normal spaced relation. The subhead 53 is adapted to be limited in its downward movement by stops 57, adjustably secured to the stationary frame by clamping bolts 58 engaging slotted bearings 59, as shown in Figs. 8 and 9. These stops do not, however, limit the downward movement of the main head, as the springs 56 will yield. The main head is actuated by cams 60 upon the shaft 9, which engage rollers 61 upon a block 62 adjustably secured by screws 63 and 64 to a bracket-arm 65 on the main head. The cam 60 positively actuates the head 50 in a downward direction, while a spring 66 returns the head as released by the cam.

The sub-head 53 carries laterally-movable folding or tucking blades 67 and 68, which are employed for successively folding the edge portions of the blank in the formation of the seam. These tucking or folding blades are positioned in the proper relation to the mandrel 17 by the setting of the adjustable stops 57, and are subsequently actuated by the relative movement of the main head which carries suitable actuating cams. To secure the proper timing and sequential movement of the tucking blades 67 and 68, the former is actuated by the downward movement of the main head 50 and the latter by the upward movement of said head, and to this end latch-cams 69 and 70 are mounted upon depending arms 71 secured to the main head 50. These latch-cams are pivotally secured in such a manner that the cam 69 will operate in its downward movement, and will trip so as to prevent actuation in its upward movement, while the cam 70 will be tripped in its downward movement and will actuate the coöperating folder in its upward movement. The folders 67 and 68 are slidably supported in depending arms 72 upon the sub-head and are pressed against the cams by springs 73.

Figure 16:
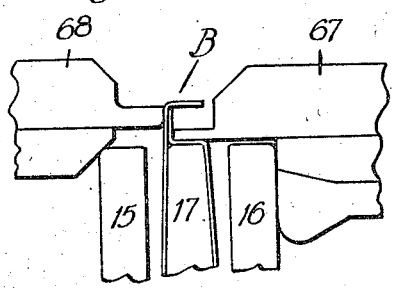
Figure 17:
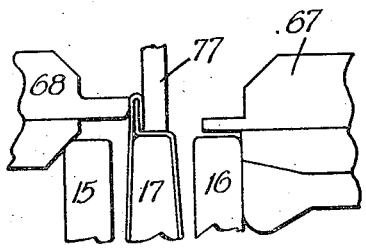
Figure 18:
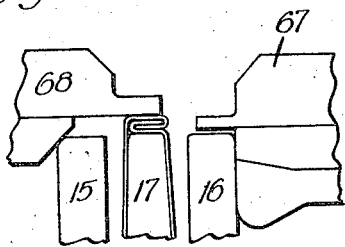

The construction of mechanism just described is such that in the operation of the machine sequential operations are performed as follows: After the blank has been folded by the wings 15 and 16 into the position shown in Fig. 15, the two hooked flanges which are to form the seam are arranged in parallel relation. The cams 60 then operate to depress the head 50, which carries downward with it the subhead 53 until the latter is arrested by the stops 57. When this occurs the folder or tucking blade 67 will be in a plane just above the upper end of the mandrel, and in the further downward movement of the head 50 the latch cam 69 will operate against a roller bearing 74 on said blade and will press the same inward against the tension of the spring 73. This will bend the hook A of the blank over the top of the mandrel and into engagement with the hook B, as shown in Fig. 16. Simultaneous with this operation, the downward movement of the head 50 will cause a cam 75 to engage a roller 76 on the tucking blade 68, moving the latter inward into the position shown in Fig. 16, where it abuts against the side of the engaged portion of the blank. A further downward movement of the head 50 will cause a blade 77 depending from said head to fold the hook B over the hook A, as shown in Fig. 17, the blade 67 having been withdrawn. To complete the formation of the seam the blade 77 is lifted sufficiently to clear the engaged hooks A and B, which is accomplished by a depression 60$^a$ in the cam 60, permitting an upward movement of the head 50. This upward movement also causes the latch-cam 70 to engage with the roll 76, which actuates the folder blade 68, projecting it into the position shown in Fig. 18 and turning over the hooks to form the double seam. As soon as the cam 70 has passed the roll 76 the blade 68 is withdrawn by the tension of the spring 73, following which the cam 60 again forces the head 50 downward, causing the blade 77 to flatten the seam, as shown in Fig. 19.

It will be understood that in the movements just described, the latch-cam 70 trips in the downward movement of the head 50, so as to pass the roll 76 without actuating the same, and in the same manner in the upward movement of the head 50, the latch-cam 69 will trip to pass the roll 74. It will also be observed that two distinct functions are performed by the blade 77 during the successive depression of the head 50, the first function being the turning down of the hook B, and the second function the flattening or compression of the finished seam.

During the final upward movement of the head 50, which completes the cycle, the finished tube is disengaged from the mandrel by the operation of a stripper. This comprises a head 78 slidably engaging transversely-extending guides 79 on the bed of the machine and actuated by a lever 80, which in turn is operated by a cam 81 on the shaft 37. To the slide 78 is secured a rod 82 slidably engaging a central slot in the mandrel 17 and carrying stripper heads 85 engaging recesses 84 on opposite sides of said mandrel. The heads 85 are normally in position in rear of the folded blank, but during the upward movement of the head 50 the cam 81, operating the lever 80, will force the head 78 forward, causing the strippers to gradually force the completed tube off the end of the mandrel. The stripping motion is one which is gradually accelerated, due to the shape of the cam 81, and just before the completion of the movement a sudden rise 81$^a$ at the end of the cam will produce a kick which propels the tube with sufficient force to clear the machine.

To adjust the machine for different sizes of work, the mandrel 17 is exchangeable, being secured to the head 32 by clamping bolts 17$^a$. When a larger or smaller mandrel is used in the machine, it is so positioned that its lower edge is in the same relation to the bed of the machine as all other sizes of mandrel. This will change the elevation of the upper edge, which necessitates an adjustment of the head 50 and of the stops 57 which position the lower head 53. The latter are adjusted by shifting the clamping bolt 58 in the slotted bearing 59, and, as before stated, this stop is so positioned that the folders 67 and 68 will be in proper relation to the upper edge of the mandrel when performing their work. The head 50 is also adjusted by the screws 63 and 64, so that the blade 77 will be in proper relation to the mandrel at the completion of the downward movement of the head. The stripper-rod 82 is free to adjust itself in relation to the mandrel by being provided with a head 82$^a$, which engages a vertical slot in the head 78. Thus the machine may be quickly adjusted to accommodate any size of mandrel and to coöperate therewith, while, as previously stated, the size of the blank may be altered by adjusting the stop 18 and severing dies 13 and 14. This latter adjustment is effected by shifting the clamping bolts 26 in the T-shaped slots 27, which adjusts the crossbar 21, carrying with it the plunger 19 and die 13. The plunger 19 is actuated by a cam 85 which is feathered upon the shaft 9, and may be adjusted to correspond to the position or adjustment of the bar 21.

In the complete operation of the machine, the sheet metal strip is intermittently advanced by the operation of the cam 8, which actuates the bell-crank lever 7 and reciprocates the feeder 5. When the stop 11 is properly set the strip will be advanced upon each reciprocation an amount corresponding to the length of the severed blank, and the end of the strip which has the upturned hook thereon will bear against the stop 18. The mandrel 17 will then be lowered to clamp the blank against the yieldable block 40, and at the same time the die 13 will be depressed to sever the blank and form the downturned hook thereon. The die 13 is then immediately retracted to provide clearance for the folding of the blank, while the continued depression of the mandrel 17 and the upward swinging movement of the wings 15 and 16 will fold the blank, as shown in Fig. 15. This occurs before the head 50 is depressed, and consequently the folding blades 67 and 68 are not in position to interfere. The seam is then formed by the successive operations as previously described and as shown in Figs. 16 and 19, after which the completed tube is ejected from the mandrel, and the cycle is repeated.

What I claim as my invention is:—

1. The combination with means for intermittently advancing a sheet metal strip, of severing means for said strip adapted to form reverse bent hooks on the adjacent ends thereof, a mandrel around which the severed blank is folded, a clamping member coacting with said mandrel, means for depressing the mandrel to clamp the central portion of the strip in advance of the folding of the same, and coöperating means for folding the blank about the mandrel while thus clamped.

2. The combination with a mandrel, of means for intermittently advancing a sheet metal strip, adjustable to vary the lengths thus advanced, means for severing and forming reverse-bent hooks upon the severed ends of said strip, adjustable in relation to said mandrel to position the severed blank in symmetrical relation thereto, and means for folding the severed blank about said mandrel.

3. The combination with a mandrel, of means for intermittently advancing a sheet metal strip beneath said mandrel, adjustable to vary the length fed, a stop on one side of said mandrel, and severing means upon the opposite side thereof, both being relatively adjustable to the mandrel to arrange the severed blank symmetrically in relation thereto, and means for folding the severed blank about the mandrel.

4. The combination with a mandrel, of means for intermittently advancing a sheet metal strip beneath said mandrel, means for adjusting the feed to vary the lengths advanced, means for severing the strip and forming reverse-bent hooks upon the severed ends thereof, said means being adjustably positioned upon one side of said mandrel, a stop adjustably positioned upon the opposite side of said mandrel to symmetrically arrange the severed blank therebeneath, means for clamping the blank against the bottom of said mandrel, and means for folding the opposite sides of the blank against the mandrel while thus clamped.

5. The combination with means for intermittently advancing a sheet metal strip, of means for severing said strip and forming reverse-bent hooks on the severed ends thereof, a mandrel arranged to extend transversely of said blank, means for lowering said mandrel, a yieldable block beneath said mandrel for clamping the blank thereagainst, and hinged wings upon opposite sides of said mandrel adapted to swing upward as the mandrel is depressed, to fold the blank.

6. The combination with a bed, of means for intermittently advancing a sheet metal strip along said bed, folding wings normally lying in the plane of said bed, a mandrel extending across said bed between said folding wings, a resiliently-yieldable block beneath said mandrel also in the plane of said bed, means for depressing said mandrel to clamp said strip against said yieldable block, means for severing the strip positioned to arrange the severed blank symmetrically in relation to said mandrel, and means operating during the continued depression of said mandrel for folding said wings upward against the opposite sides thereof.

7. The combination with a mandrel, of means for folding a sheet metal blank about said mandrel with its ends projecting above the upper edge thereof, a reciprocatory head, and mechanism carried by said head and operated during the reciprocation thereof for seaming the ends of said blank upon said mandrel.

8. The combination with a mandrel, of means for folding a sheet metal blank about said mandrel, a vertically-reciprocating head, a sub-head carried thereby, blank-seaming mechanism mounted on said sub-head, means for arresting movement of said sub-head when said seaming devices are in coöperative relation with said mandrel, and means operating upon the continued movement of the main head to actuate said seaming devices.

9. The combination with a blank-folding mechanism, of a depressible and exchangeable mandrel coöperating with said blank-folding mechanism, the lower edges of various sizes of mandrels being in the same relation to said folding mechanism, a vertically-reciprocating head, seaming mechanism carried by said head into operative relation to the upper edge of said mandrel, an adjustable stop for arresting movement of said head when said mechanism is in operative relation to the mandrel, and means for operating said seaming mechanism while in this relation.

10. The combination with blank-folding means, of a depressible and exchangeable mandrel coöperating with said blank-folding mechanism, a vertically-reciprocating head, a sub-head yieldably connected to the main head, seaming mechanism mounted on said sub-head and carried thereby into operative relation to said mandrel, an adjustable stop for variably arresting said sub-head in relation to different sizes of mandrels, and means operating by the movement of the main head subsequent to the arresting of the sub-head for actuating said seaming mechanism.

11. The combination with blank-folding mechanism, of a depressible mandrel for coöperating with said folding mechanism, a vertically-reciprocating head, a sub-head yieldably connected to the main head, laterally-movable seaming folders mounted on said sub-head, a stop for arresting downward movement of said sub-head in advance of the completion of the movement of the main head, and cams carried by said main head for operating said folders upon the sub-head.

12. The combination with blank-folding mechanism, of a depressible mandrel for coöperating with said folding mechanism, a reciprocatory head, a sub-head yieldably connected to said reciprocatory head, laterally-movable seaming folders mounted on said sub-head, a coöperating folder mounted on the main head, a stop for arresting downward movement of the sub-head, and cams carried by the main head for operating the folders on said sub-head.

13. The combination with blank-folding mechanism, of a depressible mandrel for coöperating with said folding mechanism, a vertically-slidable main head, mechanism for reciprocating said head, blank-seaming mechanism carried by said head and operated during the reciprocation thereof, and means for adjusting the movement of said head to coöperate with different sizes of mandrel.

14. The combination with blank-folding mechanism, of a depressible mandrel for coöperating with said folding mechanism, a vertically-slidable head, mechanism for reciprocating said head, a sub-head yieldably connected to the main head, coöperating blank-seaming devices carried by the main and sub-head, an adjustable stop for arresting the sub-head, and cams carried by said main head for operating the seaming devices on said sub-head.

15. The combination with a blank-folder, of means for advancing a sheet metal strip thereover, means for severing said strip adjustable in relation to said folder to form blanks of varying sizes, a mandrel arranged above said folder and coöperating therewith, a vertically-slidable head, a sub-head yieldably carried thereby, coöperating seaming devices upon said main and sub-head, a stop for arresting movement of said sub-head, and means for reciprocating said main head.

16. The combination with blank-folding means, of a depressible mandrel for coöperating therewith, a vertically-reciprocating main head, a sub-head yieldably connected with said main head, seaming folders mounted on said sub-head, a stop for arresting movement of said sub-head, and latch-cams on said main head for respectively operating on the downward and upward movements thereof for operating the seaming folders on said sub-head sequentially.

17. The combination with blank-folding mechanism, of a depressible mandrel for coöperating therewith, a vertically-slidable main head, a sub-head yieldably carried by said main head, laterally-movable seaming folders mounted on said sub-head, a stop for arresting movement of said sub-head, latch-cams on said main head for actuating said seaming folders sequentially and respectively upon the downward and upward movement of said main head, a seaming folder carried by said main head, and means for depressing said main head subsequent to the operation of said seaming folders to flatten the seam against said mandrel.

18. The combination with blank-folding means, of a depressible mandrel coöperating with said folding means, a vertically-reciprocating head, seaming mechanism carried by said head and operating during the reciprocation thereof, and means for adjusting the movement of said head to cause said seaming mechanism to operate with mandrels of various sizes.

19. The combination with means for intermittently advancing a sheet metal strip, of severing means for said strip adapted to form reverse-bent hooks on the adjacent ends thereof, coacting members, between which the strip is advanced prior to severing, one of said members forming a mandrel, means for displacing one of said members toward the other to clamp the central portion of the blank, and coöperating means for folding the blank about said mandrel while thus clamped.

20. The combination with means for intermittently advancing a sheet metal strip, of severing means for said strip adapted to form reverse-bent hooks on the adjacent ends thereof, a mandrel around which the severed blank is folded, a clamping member beneath said mandrel, a pair of wings hinged one at each side of said clamping member, over which the strip is advanced prior to severing, means for depressing the mandrel to clamp the central portion of the strip in advance of the folding of the same, and means for simultaneously swinging said wings toward opposite sides of the mandrel to fold the blank.

21. The combination with a reciprocatory head, of a mandrel carried thereby, a yieldable clamping member toward which the mandrel is displaced by the motion of said head to clamp the central portion of a sheet metal blank, and means for folding the blank about the mandrel actuated by continued movement of said head, subsequent to the clamping of the blank.

22. The combination with a mandrel, of means for intermittently advancing a sheet metal strip beneath said mandrel, means for severing and forming reverse-bent hooks upon the severed ends of said strip, and means for folding the severed blank about the mandrel.

In testimony whereof I affix my signature in presence of two witnesses.

OTTO J. GROEHN.

Witnesses:
WM. J. BELKNAP,
JAMES P. BARRY.